United States Patent
Boyd et al.

(10) Patent No.: US 6,317,787 B1
(45) Date of Patent: Nov. 13, 2001

(54) SYSTEM AND METHOD FOR ANALYZING WEB-SERVER LOG FILES

(75) Inventors: William Glen Boyd; Elijahu Shapira, both of Portland, OR (US)

(73) Assignee: WebTrends Corporation, Portland, OR (US)

( * ) Notice: Subject to any disclaimer, the term of this patent is extended or adjusted under 35 U.S.C. 154(b) by 0 days.

(21) Appl. No.: 09/132,287

(22) Filed: Aug. 11, 1998

(51) Int. Cl.$^7$ ................................................. G06F 13/00
(52) U.S. Cl. ............................................................. 709/224
(58) Field of Search .................................. 709/224, 219, 709/225, 200, 203, 217, 218

(56) References Cited

U.S. PATENT DOCUMENTS

| | | | |
|---|---|---|---|
| 5,600,632 | * 2/1997 | Schulman | 370/252 |
| 5,675,510 | 10/1997 | Coffey et al. | 364/514 A |
| 5,689,416 | 11/1997 | Shimizu et al. | 364/185 |
| 5,706,436 | * 1/1998 | Lewis et al. | 395/200.11 |
| 5,727,129 | 3/1998 | Barrett et al. | 395/12 |
| 5,732,218 | 3/1998 | Bland et al. | 395/200.54 |
| 5,774,660 | * 6/1998 | Brendel et al. | 709/201 |
| 5,774,716 | * 6/1998 | Harbinski et al. | 395/618 |
| 5,787,253 | * 7/1998 | McCreery et al. | 709/231 |
| 5,796,942 | * 8/1998 | Esbensen | 790/200 |
| 5,796,952 | * 8/1998 | Davis et al. | 709/224 |
| 5,870,559 | * 2/1999 | Leshem et al. | 709/224 |
| 5,878,223 | 3/1999 | Becker et al. | 395/200.53 |
| 5,892,917 | * 4/1999 | Myerson | 709/224 |
| 5,898,837 | * 4/1999 | Guttman et al. | 709/224 |
| 5,913,041 | * 6/1999 | Ramanathan et al. | 709/233 |
| 5,968,125 | * 10/1999 | Garrick et al. | 709/224 |
| 6,023,744 | * 2/2000 | Shoroff et al. | 711/4 |
| 6,055,572 | * 2/2000 | Saksena | 709/224 |
| 6,098,079 | * 8/2000 | Howard | 707/205 |
| 6,112,238 | * 8/2000 | Boyd et al. | 709/224 |
| 6,175,838 | * 1/2001 | Papierniak et al. | 707/223 |

OTHER PUBLICATIONS

WebTrends™ Essential Reporting for your Web Server, Installation and User Guide, Jan. 1996 Edition, by e.g. Software, Inc., 62 page manual.

SPI, Dataflow Sorting [From V Programming]p.140–143 by Wade Wialliam and Aschcrof Edward, Jan. 1985.*

* cited by examiner

*Primary Examiner*—Moustafa M. Meky
(74) *Attorney, Agent, or Firm*—Marger, Johnson & McCollom, P.C.

(57) ABSTRACT

A method for analyzing traffic data generated by a plurality of web servers, which host a single web site. The site is mirrored on each server. A traffic data hit is generated responsive to each access of one of the servers. The hit includes data representing the time of the access. Each data hit is stored in a log file on the server accessed. The first-stored data hit is read from each server. Each of the read data hits are compared, and the oldest data hit is passed to a log file analyzer. The next-stored data hit is read from the server from which the passed data hit was read, and a second comparison is performed on the read data hits, with the oldest data hit being passed to the log file analyzer. This process continues until all of the data hits are read, compared, and passed to the log file analyzer. This results in passing all of the data hits to the log file analyzer in the chronological order in which the hits were generated.

23 Claims, 6 Drawing Sheets

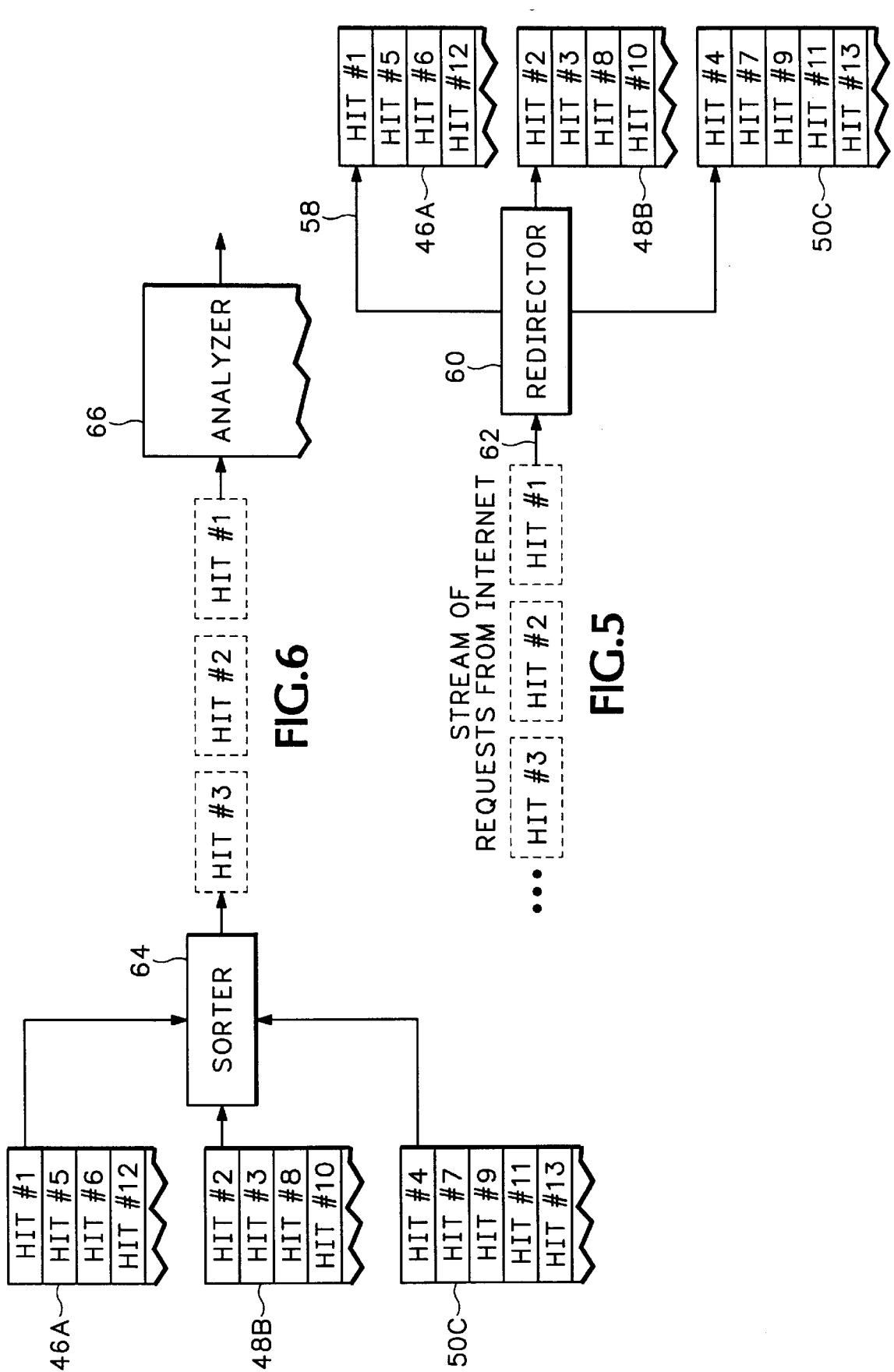

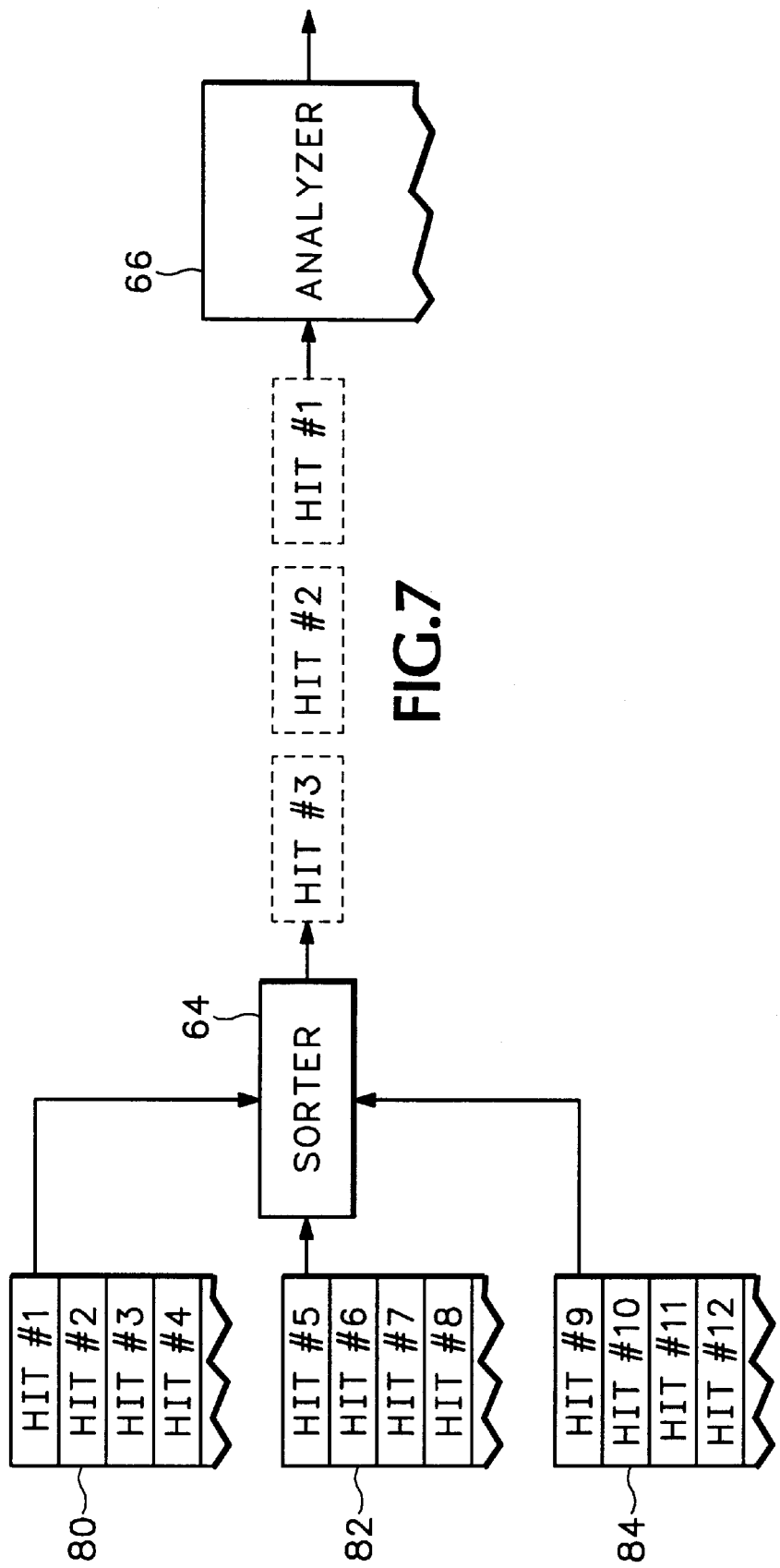

SYSTEM AND METHOD FOR ANALYZING WEB-SERVER LOG FILES

BACKGROUND OF THE INVENTION

This invention relates generally to web-server traffic data analysis and more particularly to a system and method for analyzing web-server log files.

The worldwide web (hereinafter "web") is rapidly becoming one of the most important publishing mediums today. The reason is simple: web servers interconnected via the Internet provide access to a potentially worldwide audience with a minimal investment in time and resources in building a web site. The web server makes available for retrieval and posting a wide range of media in a variety of formats, including audio, video and traditional text and graphics. And the ease of creating a web site makes reaching this worldwide audience a reality for all types of users, from corporations, to startup companies, to organizations and individuals.

Unlike other forms of media, a web site is interactive and the web server can passively gather access information about each user by observing and logging the traffic data packets exchanged between the web server and the user. Important facts about the users can be determined directly or inferentially by analyzing the traffic data and the context of the "hit." Moreover, traffic data collected over a period of time can yield statistical information, such as the number of users visiting the site each day, what countries, states or cities the users connect from, and the most active day or hour of the week. Such statistical information is useful in tailoring marketing or managerial strategies to better match the apparent needs of the audience. Each hit is also encoded with the date and time of the access. Because the statistical information of interest is virtually all related to time periods, accurately tracking the time of each hit is critical.

To optimize use of this statistical information, web server traffic analysis must be timely. However, it is not unusual for a web server to process thousands of users daily. The resulting access information recorded by the web server amounts to megabytes of traffic data. Some web servers generate gigabytes of daily traffic data. Analyzing the traffic data for even a single day to identify trends or generate statistics is computationally intensive and time-consuming. Moreover, the processing time needed to analyze the traffic data for several days, weeks or months increases linearly as the time frame of interest increases.

The problem of performing efficient and timely traffic analysis is not unique to web servers. Rather, traffic data analysis is possible whenever traffic data is observable and can be recorded in a uniform manner, such as in a distributed database, client-server system or other remote access environment.

Some web servers are so busy, i.e., handle so much traffic, that they require multiple servers to handle all of the traffic. Other users may need to employ multiple servers because of the large size of the web site. Critical sites, i.e., ones that cannot afford to be down because of a problem with a server, may also choose to deploy their site on multiple servers. Such multiple servers are sometimes referred to as a server farm. Server farms provide high bandwidth reliable access to web sites.

There are several topologies that may be used in a server farm, but the most important ones divide the farm into clusters of servers. The web site is mirrored on each server within the cluster. Special hardware receives all of the traffic to the web site and distributes each hit to one of the servers. Some systems provide accurate load balancing in that all of the hits are rotated in sequence among each of the servers. But others assign each hit from a new source to a server, and further access to the site from that source is directed to the assigned server. This is accomplished by assigning a predetermined time period, for example 30 minutes, during which all future access from the same source is considered to be part of a single session from that source. As described further below, the latter approach permits some log-file analysis, which is not possible using the load-balancing technique.

Server farms, although providing load balancing and redundancy, present problems in analyzing the log files generated by the servers. Prior art systems for analyzing web-server log files can handle multiple log files, but these files are consecutively generated, i.e., the data packets within each log file are in chronological order and the log files themselves correspond to time periods containing data packets from within the periods. In other words, the log files are also consecutively generated. Log files on servers in a server farm, however, are concurrently generated. Each log file covers or overlaps the same time period. On server farms that rotate the hits among each server, log file analysis programs do not generate useful information. Brute force solutions are possible, such as sorting all of the log files and creating a new single file, or copying all of the hits from each log file to a large database, which can sort and analyze the data. These solutions have severe drawbacks: they are computationally intensive, they require creation of large new files, and they are done only after log files are complete, i.e., not on the fly while the log file is still being populated.

Server farms that assign hits from a new source to a single user can run prior art log analysis programs on each server and sum the results. This, however, is not completely accurate and is disadvantageous because it requires generation of separate reports that must each be consulted or further manipulated to obtain information that applies to the entire server farm.

There is consequently a need for a system and method for analyzing web-server log files that are concurrently generated, such as those generated by a server farm.

There is a further need for such a system and method that can analyze the log files substantially in real time.

There is still a further need for such a system that can analyze the log files without generating new large files and without the need for substantial additional computing power.

There is also a need for such a system that can analyze log files whether they are concurrently or consecutively generated.

SUMMARY OF THE INVENTION

The present invention comprises a method for analyzing log files containing a plurality of data packets in sequence comprising: (a) selecting the first data packet in each log file; (b) comparing the selected data packets; (c) passing the oldest of the selected data packets to a log file analyzer; (d) selecting the next data packet in the log file in which the passed data packet was selected; and (e) repeating steps (b) through (d) until all of the data packets in the log files are passed.

The foregoing and other features and advantages of the invention will become more readily apparent from the following detailed description of a preferred embodiment of the invention, which proceeds with reference to the accompanying drawings.

BRIEF DESCRIPTION OF THE DRAWINGS

FIG. 5 is a schematic diagram illustrating the operation of the server farm of FIG. 4.

FIG. 6 is a schematic diagram illustrating the present invention implemented in the server farm of FIG. 4.

FIG. 7 is a schematic diagram similar to FIG. 6, but illustrating the present invention operating on consecutive log files.

DETAILED DESCRIPTION OF THE PREFERRED EMBODIMENT

Figure 1:
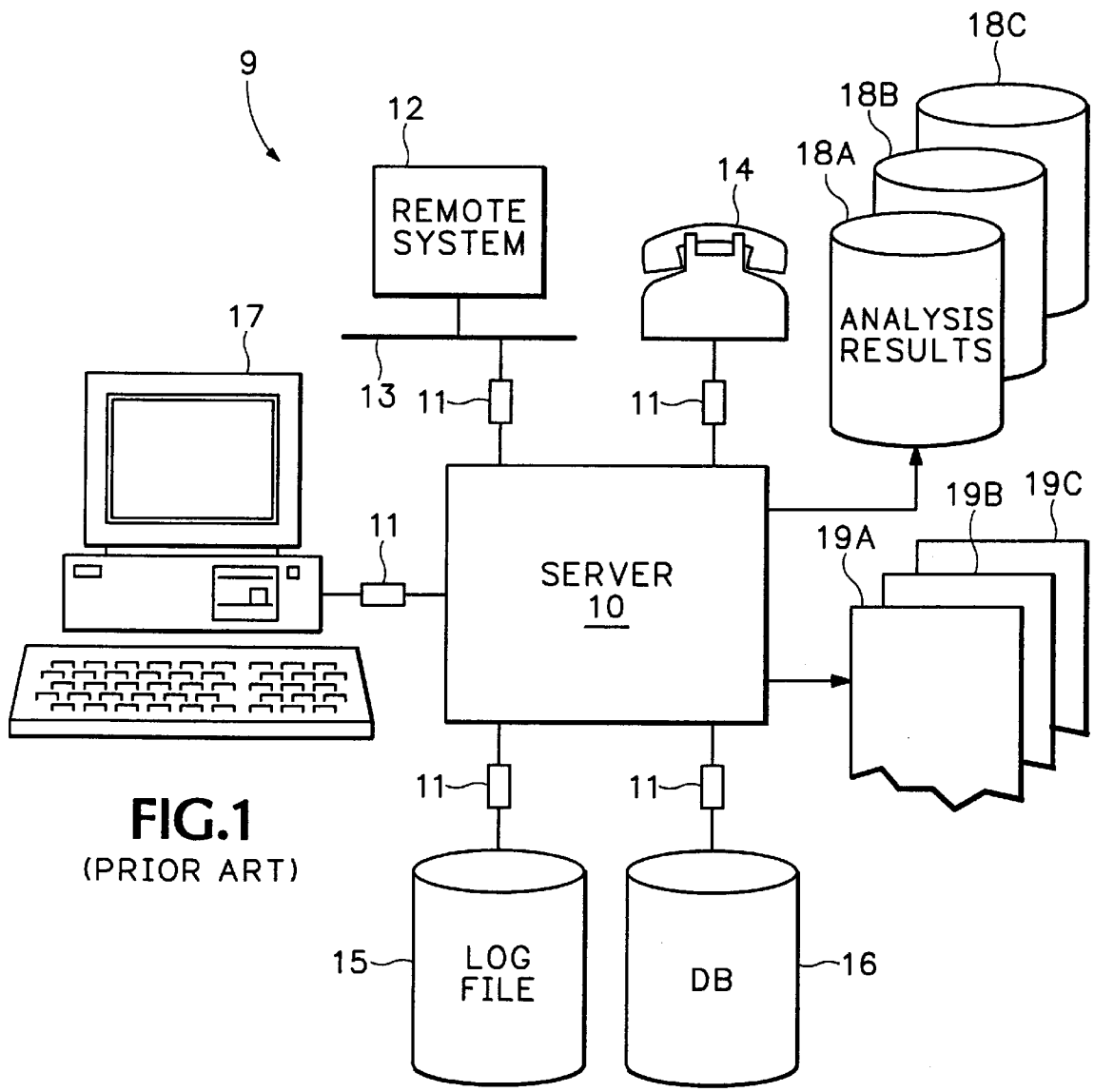
FIG. 1 is a functional block diagram of a prior art system for analyzing traffic data in a distributed computing environment according to the present invention.

FIG. 1 is a functional block diagram of a prior art system for analyzing traffic data in a distributed computing environment 9. It is more fully described in "WebTrends Installation and User Guide," version 2.2, October 1996, and in U.S. patent application Ser. No. 08/801,707, now U.S. Pat. No. 6,112,238, the disclosures of which are incorporated herein by reference. WebTrends is a trademark of Webtrends Corporation, Portland, Oreg.

A server 10 provides web site and related services to remote users. By way of example, the remote users can access the server 10 from a remote computer system 12 interconnected with the server 10 over a network connection 13, such as the Internet or an intranetwork, a dial up (or point-to-point) connection 14 or a direct (dedicated) connection 17. Other types of remote access connections are also possible.

Each access by a remote user to the server 10 results in a "hit" of raw traffic data 11. The format used in storing each traffic data hit 11 and an example of a traffic data hit 11 are described below with reference to FIGS. 3A and 3B, respectively. The server 10 preferably stores each traffic data hit 11 in a log file 15, although a database 16 or other storage structure can be used.

To analyze the traffic data, the server 10 examines each traffic data hit 11 and stores the access information obtained from the traffic data as analysis results 18A–C. Five sources of traffic data 11 (remote system 12, dial-up connection 14, log file 15, database 16 and direct connection 17) are shown. Other sources are also possible. The traffic data hits 11 can originate from any single source or from a combination of these sources. While the server 10 receives traffic data hits 11 continuously, separate sets of analysis results 18A–C are stored for each discrete reporting period, called a time slice. The analysis results 18A–C are used for generating summaries 19A–C of the access information.

In the described embodiment, the server 10 is typically an Intel Pentium-based computer system equipped with a processor, memory, input/output interfaces, a network interface, a secondary storage device and a user interface, preferably such as a keyboard and display. The server 10 typically operates under the control of either the Microsoft Windows NT or Unix operating systems and executes either Microsoft Internet Information Server or NetScape Communications Server software. Pentium, Microsoft, Windows, Windows NT, Unix, Netscape and Netscape Communications Server are trademarks of their respective owners. However, other server 10 configurations varying in hardware, such as DOS-compatible, Apple Macintosh, Sun Workstation and other platforms, in operating systems, such as MS-DOS, Unix and others, and in web software are also possible. Apple, Macintosh, Sun and MS-DOS are trademarks of their respective owners.

Figure 2:
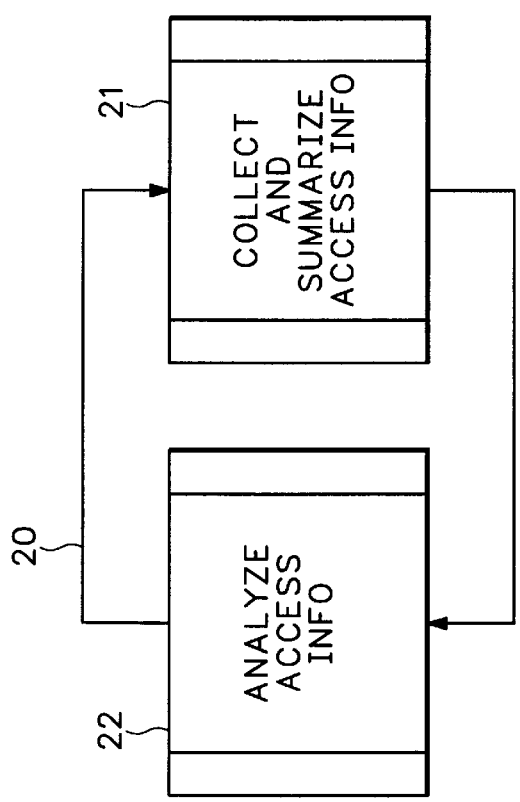
FIG. 2 is a flow diagram of a prior art method for analyzing traffic data in a distributed computing environment according to the present invention using the system of FIG. 1.

FIG. 2 is a flow diagram of a method 20 for analyzing traffic data in a distributed computing environment according to the present invention using the system of FIG. 1. Its purpose is to continuously collect and summarize access information from traffic data hits 11 while allowing on-demand, ad hoc analyses. The method 20 consists of two routines. Access information is collected from traffic data hits 11 and summarized by the server 10 into analysis results 18A–C (block 21). The access information is separately analyzed for generating the summaries 19A–C which identify trends, statistics and other information (block 22). The collection and summarizing of the access information (block 21) is performed continuously by the server 10 while the analysis of the access information (block 22) is performed on an ad hoc basis by either the server 10 or a separate workstation (not shown).

The method 20 is preferably implemented as a computer program executed by the server 10 and embodied in a storage medium comprising computer-readable code. In the described embodiment, the method 20 is written in the C programming language, although other programming languages are equally suitable. It operates in a Microsoft Windows environment and can analyze Common Log File, Combined Log File and proprietary log file formats from industry standard web servers, such as those licensed by NetScape, NCSA, O'Reilly WebSite, Quarterdeck, C-Builder, Microsoft, Oracle, EMWAC, and other Windows 3.x, Windows NT 95, Unix and Macintosh Web servers. The analysis results 18A–C can be stored in a proprietary or standard database 16 (shown in FIG. 1), such as SQL, BTRIEVE, ORACLE, INFORMIX and others. The method 20 uses the analysis results 18A–C of traffic data hits 11 as collected into the log file 15 or database 16 for building activity, geographic, demographic and other summaries 19A–C, such as listed below in Table 1. Other summaries 19A–C are also possible.

TABLE 1

| | |
|---|---|
| User Profile by Regions | General Statistics Table |
| Top Requested Pages | Least Requested Pages |
| Top Entry Pages | Top Exit Pages |
| Single Access Pages | Top Paths Through Site |
| Advertising Views | Advertising Clicks |
| Advertising Views and Clicks | Most Downloaded Files |
| Most Active Organizations | Most Active Countries |
| Activity Summary by Day of Week | Activity Summary by Day |
| Activity Summary by Hour of the Day | Activity Summary Level by Hours of the Day |
| Web Server Statistics and Analysis | Client Errors |
| Top Downloaded File Types and Sizes | Server Errors |
| Activity by Organization Type | Top Directories Accessed |
| Top Referring Sites | Top Referring URLs |
| Top Browsers | Netscape Browsers |
| Microsoft Explorer Browsers | Visiting Spiders |
| Top Platforms | |

In addition, the analysis results 18A–C can be used for automatically producing reports and summaries which include statistical information and graphs showing, by way of example, user activity by market, interest level in specific web pages or services, which products are most popular, whether a visitor has a local, national or international origin and similar information. In the described embodiment, the summaries 19A–C can be generated as reports in a variety of formats. These formats include hypertext markup language (HTML) files compatible with the majority of popular web browsers, proprietary file formats for use with word processing, spreadsheet, database and other programs, such as Microsoft Word, Microsoft Excel, ASCII files and various other formats. Word and Excel are trademarks of Microsoft Corporation, Redmond, Wash.

Figure 3A:
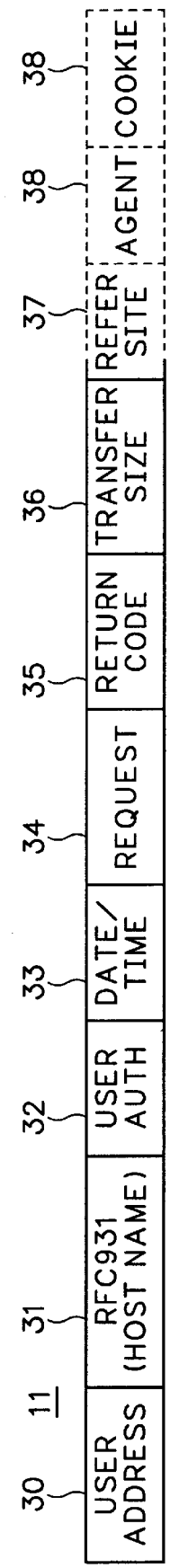
FIG. 3A shows a prior art format used in storing a "hit" of traffic data received by the server of FIG. 1.

FIG. 3A shows a format used in storing a "hit" of raw traffic data 11 received by the server of FIG. 1. A raw traffic data hit 11 is not in the format shown in FIG. 3A. Rather, the contents of each field in the format is determined from the data packets exchanged between the server 10 and the source of the traffic data hit 11 and the information pulled from the data packets is stored into a data record using the format of FIG. 3A prior to being stored in the log file 15 (shown in FIG. 1) or processed.

Each traffic data hit 11 is a formatted string of ASCII data. The format is based on the standard log file format developed by the National Computer Security Association (NCSA), the standard logging format used by most web servers. The format consists of seven fields as follows:

| Field Name | Description |
| --- | --- |
| User Address (30): | Internet protocol (IP) address or domain name of the user accessing the site. |
| RFC931 (31): | Obsolete field usually left blank, but increasingly used by many web servers to store the host domain name for multi-homed log files. |
| User Authentication (32): | Exchanges the user name if required for access to the web site. |
| Date/Time (33): | Date and time of the access and the time offset from GMT. |
| Request (34): | Either GET (a page request) or POST (a form submission) command. |
| Return Code (35): | Return status of the request which specifies whether the transfer was successful. |
| Transfer Size (36): | Number of bytes transferred for the file request, that is, the file size. |

In addition, three optional fields can be employed as follows:

| Field Name | Description |
| --- | --- |
| Referring Site (37): | URL used to obtain web site information for performing the "hit." |
| Agent (38): | Browser version, including make, model or version number and operating system. |
| Cookie (39): | Unique identifier pemiissively used to identify a pariicular user. |

Other formats of traffic data hits 11 are also possible, including proprietary formats containing additional fields, such as time to transmit, type of service operation and others. Moreover, modifications and additions to the formats of raw traffic data hits 11 are constantly occurring and the extensions required by the present invention to handle such variations of the formats would be known to one skilled in the art.

Figures 3B, 4:
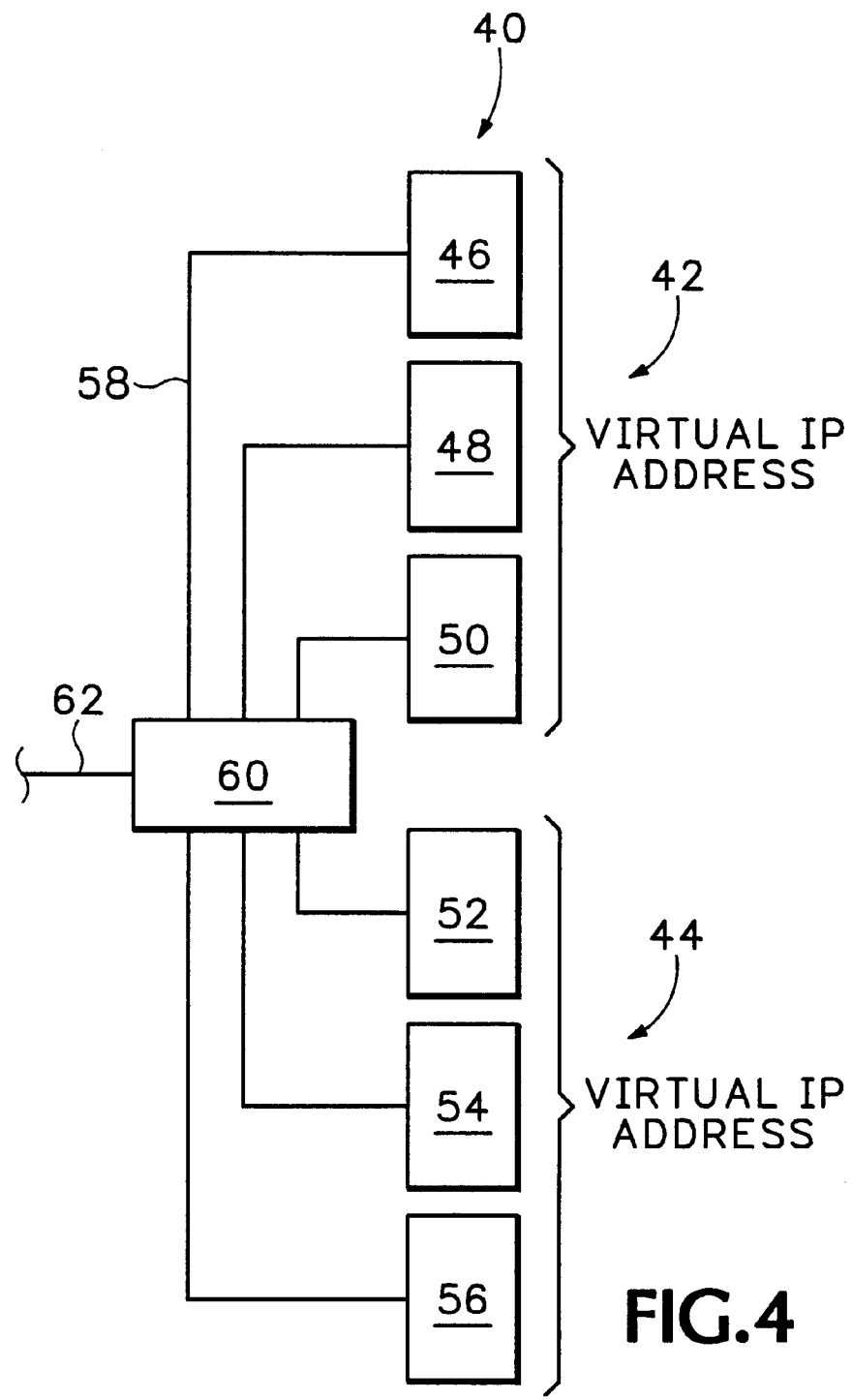
FIG. 3B shows, by way of example, a "hit" of formatted traffic data received by the server of FIG. 1.
FIG. 4 is a schematic diagram of a server farm, including multiple servers like that shown and described in FIG. 1.

FIG. 3B shows, by way of example, a "hit" of raw traffic data received by the server of FIG. 1. The user address 30 field is "tarpon.gulf.net" indicating the user originates from a domain named "gulf.net" residing on a machine called "tarpon." The RFC931 31 and user authorization 32 fields are "–" indicating blank entries. The Date/Time 33 field is "Jan. 12, 1996:20:38:17+0000" indicating an access on Jan. 12, 1996 at 8:38:17 pm GMT. The Request 34 field is "GET/general.htm HTTP/1.0" indicating the user requested the "general.htm" page. The Return Code 35 and Transfer Size 36 fields are 200 and 3599, respectively, indicating a successful transfer of 3599 bytes.

Turning now to FIG. 4, indicated generally at 40 is a server farm constructed in accordance with the present invention. Included therein are two server clusters 42, 44, each of which includes servers 46, 48, 50 and servers 50, 52, 54, respectively. Each of the servers in clusters 42, 44 are substantially identical to server 10 in FIG. 1. In the present embodiment, server cluster 42 hosts a first web site, which is mirrored on each of the servers therein, at a single identified Internet Protocol (IP) address. The servers in cluster 44 host a second web site, which is mirrored on each of the servers therein, at a second identified IP address.

Each of the servers in clusters 42, 44 is connected via a cable, like cable 58, to a redirector 60. The redirector in turn receives an input from a network connection 62, which in the present embodiment is an Internet connection. Redirector 60 is a prior art hardware device that receives a source of traffic data hits—in the present case, via connection 62—and distributes them to the servers in clusters 42, 44.

In the present implementation, redirector 60 distributes traffic data hits within each of clusters 42, 44. In other words, the traffic data hits generated as a result of access to the web site posted on cluster 42, are distributed among servers 46, 48, 50. Similarly, traffic data hits produced by accessing the web site on cluster 44 are distributed among servers 52, 54, 56. One device suitable for functioning as a redirector is manufactured by Cisco Systems and sold under the name LocalDirector. Those having skill in the art will appreciate that other known hardware devices can perform the function of redirector 60.

Turning now to FIG. 5, log files 46A, 48A, 50A, are each stored on the server corresponding to the numeral used to indicate the log file. These log files are generated and stored in the manner described in connection with the server of FIG. 1. In FIG. 5, the hits are numbered sequentially, hit number 1 through hit number 13 in the chronological order in which each traffic data hit was generated. In the depiction of FIG. 5, each of log files 46A, 48A, 50A is still being added to. That is in log file 46A, for example, hit number 1 is the first-stored data hit, and hit number 5 is the next-stored data hit, with hits numbers 6 and 12 being thereafter stored in sequence. Because log file 46A is not yet full and it remains open, additional hits may be stored in sequence after hit number 12. The same is true for logs file 48A, 50A.

Turning now to FIG. 6, included therein is a sorter 64, which examines the hits in sequence in each of the log files and passes them—in the chronological order in which each hit was generated—to a log file analyzer 66. The log file analyzer operates generally as described in connection with the server depicted in FIG. 1. Thereafter, analysis results are passed to analysis results 18A–C, also as described in connection with FIG. 1.

Figure 8:
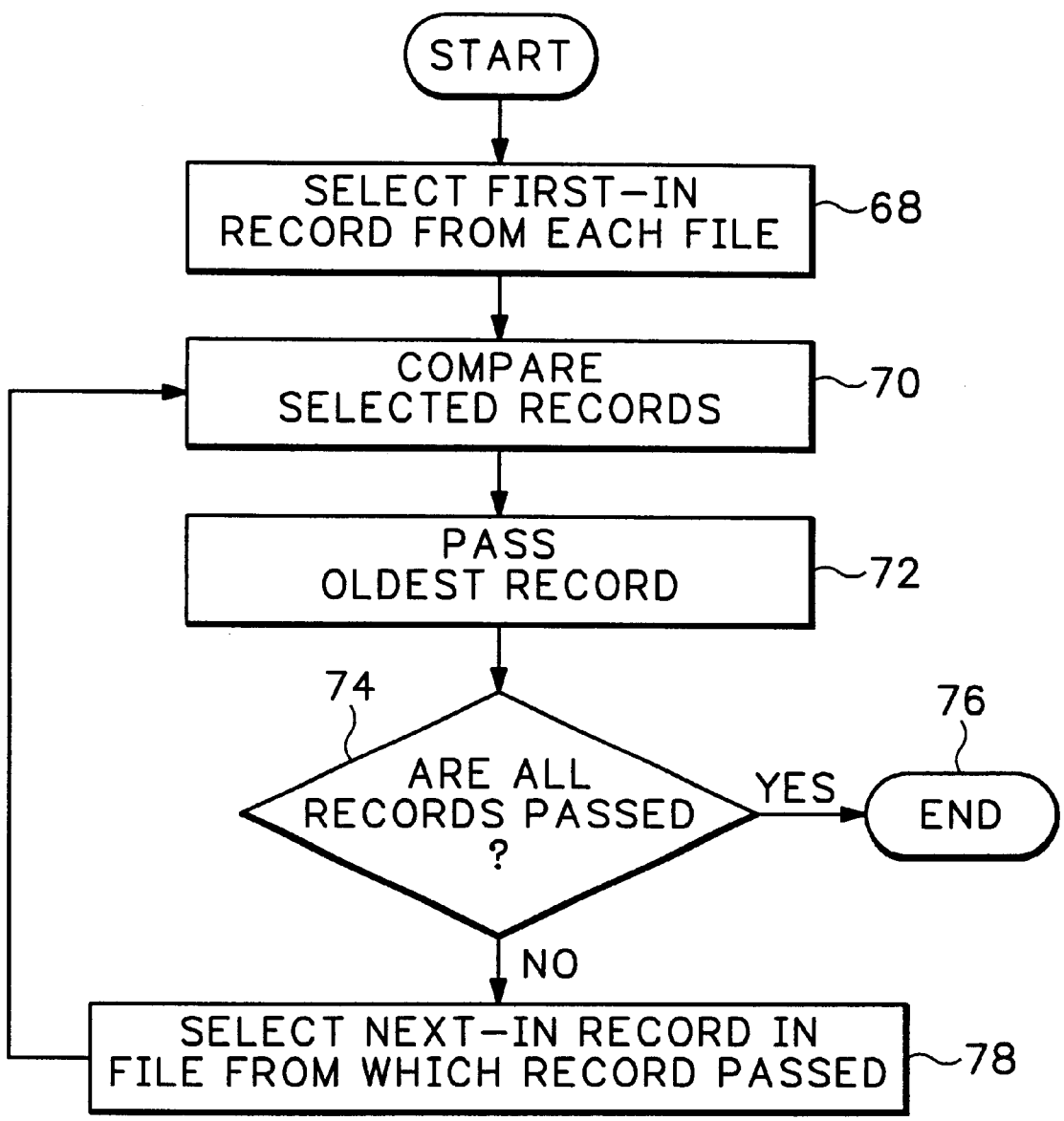
FIG. 8 is a flow diagram of a routine for implementing the present invention.

The operation of sorter 64 can best be understood with reference to the following Table 2 and to the flow diagram depicted in FIG. 8.

TABLE 2

| Compare | | | Passes |
|---|---|---|---|
| 1 | 2 | 4 | 1 |
| 5 | 2 | 4 | 2 |
| 5 | 3 | 4 | 3 |
| 5 | 8 | 4 | 4 |
| 5 | 8 | 7 | 5 |
| 6 | 6 | 7 | 6 |
| 12 | 8 | 7 | 7 |
| 12 | 8 | 9 | 8 |
| 12 | 10 | 9 | 9 |
| 12 | 10 | 11 | 10 |
| . | . | . | . |
| . | . | . | . |
| . | . | . | . |

First, in block 68 of FIG. 8, the first record received in each log file 46A, 48A, 50A is selected. This selection is depicted in Table 2, line 1, in which hits 1, 2, and 4 appear in the Compare column. In block 70, sorter 64 compares each of hits 1, 2, and 4 and passes the oldest (in time) record, namely hit 1 (block 72). The routine next determines, in block 74, whether all the records in all of the log files have been selected, compared, and passed. If so, the routine ends in block 76. If not, in block 78 the routine selects the next record in the log file containing the record that was passed in block 72. In the example currently under consideration, the next record is hit number 5 in log file 46A. Next—with reference to line 2 of Table 2—in block 70, hits 5, 2 and 4 are compared, and hit 2 is passed, it being the oldest (in time) of the three records compared.

Because the routine operates in first-in, first-out (FIFO) sequence on each of the log files, it can process while the files remain open and continue to receive additional hits in sequence.

In the example of FIG. 7, log files 80, 82, 84 are operated on by sorter 64. It should be noted that these log files include hits that are in sequential chronological order. What is more, each of the log files is generated in chronological order. Thus, log file 80 represents an identified time period, ranging between the time associated with hit 1 and the time of hit 4; log file 82, ranging between the times of hits 5 and 8; and log file 84, between hits 9 and 12. With reference again to FIG. 8, and to Table 3, which depicts the sequential comparisons made on the log-file records in FIG. 7, hits 1, 5 and 9 are selected in block 68 and compared in block 70. Hit 1, the oldest record, is passed in block 72 and the next-in record, hit number 2, is selected in block 78. This sequence continues until all of hits 1 through 12 are passed, hits 1 through 4 being first passed in sequence from log file 80, hits 5 through 8 being next passed in sequence from log file 82, and finally hits 9 through 12 in sequence from log file 84.

TABLE 3

| Compare | | | Passes |
|---|---|---|---|
| 1, | 5 | 9 | 1 |
| 2, | 5 | 9 | 2 |
| 3, | 5 | 9 | 3 |
| 4 | 5 | 9 | 4 |
| — | 5 | 9 | 5 |
| — | 6 | 9 | 6 |
| — | 7 | 9 | 7 |
| — | 8 | 9 | 8 |
| — | — | 9 | 9 |
| — | — | 10 | 10 |

The present invention therefore properly sorts traffic data hits in either concurrently-generated or consecutively-generated log files. This is advantageous because it obviates the need for separate routines or for configuring a program dependant upon whether the log files are consecutive or concurrent. In addition, the present invention is capable of sorting log files while they continue to receive and store new traffic data hits. This analysis on the fly provides users with statistical data and reports on a near real time basis.

Numerous modifications and embodiments of the invention will be obvious to those skilled in the art. Although the present invention has been described in terms of one embodiment, this should not be interpreted as limiting. Various alterations, modifications and combinations will no doubt become apparent to those skilled in the art after having read the above disclosure. Accordingly, the appended claims should be interpreted as covering all alterations and modifications that fall within the spirit and scope of the invention.

We claim:

1. A method for analyzing traffic data generated by a plurality of web servers connected via a network to a plurality of computing devices comprising:

(a) generating a plurality of traffic data hits, each of said hits corresponding to a data packet exchanged between one of the servers and one of the computing devices;

(b) associating the data hits with their respective servers;

(c) reading a first data hit from each server;

(d) comparing the read data hits;

(e) passing the oldest data hit;

(f) reading the next data hit from the server from which the passed data hit was read;

(g) repeating (d) through (e) until all of the data hits are read; and (h) analyzing the passed data hits.

2. The method of claim 1 wherein (b) and (c) are performed substantially simultaneously.

3. The method of claim 2 wherein associating the data hits with their respective servers comprises storing each data hit in a log file on its associated server, said traffic data hits being generated in chronological sequence, and wherein different ones of said log files contain data hits corresponding to traffic data hits generated in the same time period.

4. The method of claim 2 wherein said web servers mirror one another.

5. The method of claim 1 wherein (b) is entirely performed prior to (c).

6. The method of claim 5 wherein associating the data hits with their respective servers comprises storing each data hit in a log file on its associated server, said traffic data hits being generated in chronological sequence, and wherein different ones of said log files contain data hits corresponding to traffic data hits generated in the same time period.

7. The method of claim 5 wherein said web servers mirror one another.

8. The method of claim 1 wherein said web servers mirror one another.

9. The method of claim 1 wherein associating the data hits with their respective servers comprises storing each data hit in a log file on its associated server.

10. The method of claim 9 wherein said traffic data hits are generated in chronological sequence and wherein different ones of said log files contain data hits corresponding to traffic data hits generated in the same time period.

11. A method for analyzing log files containing a plurality of data hits in sequence, each of which corresponds to a traffic data hit generated by a web server, said method comprising:

(a) selecting the first data hit in each log file;

(b) comparing the selected data hits;

(c) passing the oldest of the selected data hits to a log file analyzer;

(d) selecting the next data hit in the log file in which the passed data hit was selected; and (e) repeating steps (b) through (d) until all of the data hits in the log files are passed.

12. The method of claim 11 wherein said data hits are each associated with a unique time and wherein the last record in one file is associated with a time later than the first record in another file.

13. The method of claim 12 wherein one of said log files is generated by a first web server and wherein another of said log files is generated by a second web server.

14. The method of claim 11 wherein said log files are each associated with a unique time period and wherein the time for each data hit is within the period for its log file.

15. The method of claim 11 wherein one of said log files is generated by a first web server and wherein another of said log files is generated by a second web server.

16. A method for analyzing web-server log files comprising:

generating traffic data hits representing actions on the web server;

generating a data hit associated with each traffic data hit, each data hit being associated with a unique time;

storing the data hits in a plurality of log files;

sorting data hits from a plurality of the log files into chronological order; and analyzing the sorted data hits.

17. The method of claim 16 wherein storing the data hits in sequence in a plurality of log files comprises alternating storing the data hits into different log files.

18. The method of claim 17 wherein the data hits within each log file are stored in sequence.

19. The method of claim 18 wherein sorting data hits from a plurality of the log files into chronological order comprises:

(a) selecting the first data hit in each log file;

(b) comparing the selected data hits;

(c) passing the oldest of the selected data hits to a log file analyzer;

(d) selecting the next data hit in the log file in which the passed data hit was selected; and (e) repeating (b) through (d) until all of the data hits in the log files are passed.

20. The method of claim 19 wherein storing the data hits in a plurality of log files and sorting data hits from a plurality of log files into chronological order are performed substantially simultaneously.

21. The method of claim 19 wherein storing the data hits in a plurality of log files is performed prior to sorting data hits from a plurality of log files into chronological order.

22. A system for analyzing web-server log files comprising:

a source of traffic data hits generated by a web server; each of said data hits being associated with a unique time;

a log file containing the data hits in sequence;

a sorter for sorting the data hits from a plurality of the log files into chronological order; and an analyzer for analyzing the sorted data hits.

23. The system of claim 22 wherein said sorter comprises:

means for selecting a data hit in each log file;

means for comparing the selected data hits; and means for passing the oldest of the selected data hits to the analyzer.

* * * * *